(12) United States Patent
Forbes et al.

(10) Patent No.: US 11,083,125 B2
(45) Date of Patent: Aug. 10, 2021

(54) SYSTEM AND METHOD FOR DETERMINING FIELD CHARACTERISTICS BASED ON GROUND ENGAGING TOOL LOADS

(71) Applicant: CNH Industrial Canada, Ltd., Saskatoon (CA)

(72) Inventors: Alan Forbes, Waterford, WI (US); James W. Henry, Saskatoon (CA); Robert A. Zemenchik, Kenosha, WI (US)

(73) Assignee: CNH Industrial Canada, Ltd., Saskatoon (CA)

( * ) Notice: Subject to any disclaimer, the term of this patent is extended or adjusted under 35 U.S.C. 154(b) by 256 days.

(21) Appl. No.: 16/220,800

(22) Filed: Dec. 14, 2018

(65) Prior Publication Data
US 2020/0187408 A1    Jun. 18, 2020

(51) Int. Cl.
| A01B 79/00 | (2006.01) |
| A01B 33/16 | (2006.01) |
| A01B 67/00 | (2006.01) |
| A01B 63/00 | (2006.01) |

(52) U.S. Cl.
CPC ............ *A01B 79/005* (2013.01); *A01B 33/16* (2013.01); *A01B 63/002* (2013.01); *A01B 67/00* (2013.01)

(58) Field of Classification Search
CPC ..... A01B 79/005; A01B 33/16; A01B 63/002; A01B 67/00
USPC .......................................................... 701/50
See application file for complete search history.

(56) References Cited

U.S. PATENT DOCUMENTS

| 5,769,170 | A * | 6/1998 | Skjaeveland | .......... A01B 49/06 172/142 |
| 6,138,771 | A * | 10/2000 | Skjaeveland | .......... A01B 35/24 172/708 |
| 6,422,323 | B1 * | 7/2002 | Dietrich, Sr. | .......... A01B 49/02 172/724 |
| 6,612,378 | B2 * | 9/2003 | Sauder | ................ A01B 49/027 172/145 |
| 7,017,675 | B2 * | 3/2006 | Ankenman | ............ A01B 49/02 172/142 |
| 8,118,649 | B1 * | 2/2012 | Murray | ................... A01F 12/28 460/5 |
| 8,271,164 | B2 * | 9/2012 | Melanson | ............ A01B 69/004 701/50 |
| 8,282,453 | B1 * | 10/2012 | Hillen | ................ A01D 41/1276 460/13 |

(Continued)

FOREIGN PATENT DOCUMENTS

| WO | WO1998003053 | 1/1998 |
| WO | WO2012102667 | 8/2012 |

*Primary Examiner* — Yazan A Soofi
(74) *Attorney, Agent, or Firm* — Rebecca L. Henkel; Rickard K. DeMille (57) ABSTRACT

In one aspect, a system for determining field characteristics of a field across which an implement is being moved may include a tine configured to engage a surface of soil within the field. The system may also include a sensor configured to detect a parameter indicative of a load being applied to the ground engaging tine by the soil. Furthermore, the system may include a controller communicatively coupled to the sensor, with the controller being configured to determine a field characteristic of the field based on measurement signals received from the sensor.

20 Claims, 5 Drawing Sheets

(56) References Cited

U.S. PATENT DOCUMENTS

| | | | | |
|---|---|---|---|---|
| 8,448,587 | B2* | 5/2013 | Kowalchuk | A01C 7/105 111/200 |
| 8,862,339 | B2* | 10/2014 | Henry | A01C 5/062 701/50 |
| 9,265,187 | B2* | 2/2016 | Cavender-Bares | B64C 39/024 |
| 9,282,688 | B2* | 3/2016 | Casper | A01B 79/005 |
| 10,681,861 | B2* | 6/2020 | Morgan | G01N 33/246 |
| 2016/0029547 | A1 | 2/2016 | Casper et al. | |
| 2016/0212933 | A1 | 7/2016 | Block et al. | |
| 2017/0079197 | A1* | 3/2017 | Steinlage | A01B 63/14 |
| 2017/0112043 | A1 | 4/2017 | Nair et al. | |
| 2017/0118901 | A1* | 5/2017 | Stark | A01B 76/00 |
| 2018/0168094 | A1* | 6/2018 | Koch | A01C 7/203 |
| 2020/0100420 | A1* | 4/2020 | Sporrer | A01B 63/24 |

\* cited by examiner

SYSTEM AND METHOD FOR DETERMINING FIELD CHARACTERISTICS BASED ON GROUND ENGAGING TOOL LOADS

FIELD OF THE INVENTION

The present disclosure generally relates to agricultural implements and, more particularly, to systems and methods for determining field characteristics of a field across which an agricultural implement is being moved based on the loads being exerted on one or more ground engaging tools of the implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground engaging tools, such as harrow discs, shanks, leveling discs, tines, rolling baskets, and/or the like, which loosen and/or otherwise agitate the soil to prepare the soil for subsequent planting operations.

Upon completion of the tillage operation, it is generally desirable that the field have certain field characteristics, such as a desired surface roughness and/or percent residue coverage. In this regard, it may be necessary to adjust one or more operating parameters of the tillage implement during the tillage operation to ensure that the field has such characteristics. However, it may be difficult for the tillage implement operator to accurately determine the field characteristic(s) while performing the tillage operation.

Accordingly, an improved system and method for determining field characteristics of a field across which an agricultural implement is being moved would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for determining field characteristics of a field across which an implement is being moved. The system may include a tine configured to engage a surface of soil within the field. The system may also include a sensor configured to detect a parameter indicative of a load being applied to the ground engaging tine by the soil. Furthermore, the system may include a controller communicatively coupled to the sensor, with the controller being configured to determine a field characteristic of the field based on measurement signals received from the sensor.

In another aspect, the present subject matter is directed to an agricultural implement. The agricultural implement may include a frame and a harrow supported on the frame. The harrow may include a tine configured engage a surface of soil within a field across which the agricultural implement is being moved. The agricultural implement may also include a load pin configured to detect a load being applied to the ground engaging tine by the soil. Additionally, the agricultural implement may include a controller communicatively coupled to the load pin, with the controller configured to determine a field characteristic of the field based on measurement signals received from the load pin.

In a further aspect, the present subject matter is directed to a method for determining field characteristics of a field across which an agricultural implement is being moved. The agricultural implement may include a tine configured to engage a surface of soil within the field. The method may include monitoring, with a computing device, a load being applied to the ground engaging tine by soil within the field. The method may also include determining, with the computing device, a field characteristic of the field based on the monitored load. Furthermore, when the determined field characteristic exceeds or falls below a threshold field characteristic value, the method may include initiating, with the computing device, a control action.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining field characteristics of a field across which an agricultural implement is being moved. Specifically, in several embodiments, a controller of the disclosed system may be configured to receive measurement signals or other data from one or more sensors as the implement is being moved across a field. Each sensor may, in turn, be configured to detect a parameter indicative of the load being applied to a corresponding ground engaging tine of the implement, such as a harrow tine, by the soil within the field. In this regard, the controller may be configured to determine or estimate one or more field characteristics of the field, such as clod size, surface roughness, percent residue coverage, and/or residue size, based on the received measurement signals. Thereafter, in the event that the determined field characteristic(s) exceeds or falls below an associated threshold field characteristic value, the controller may be configured to initiate one or more control actions. Such control action(s) may generally be associated with adjusting the field characteristic(s). For example, in one embodiment, the control action(s) may include adjusting one or more operating parameters of the implement, such as the ground speed of the implement, the penetration depth of a ground engaging shank(s) of the implement, and/or the down pressure being applied to the ground engaging tine.

Figure 1:
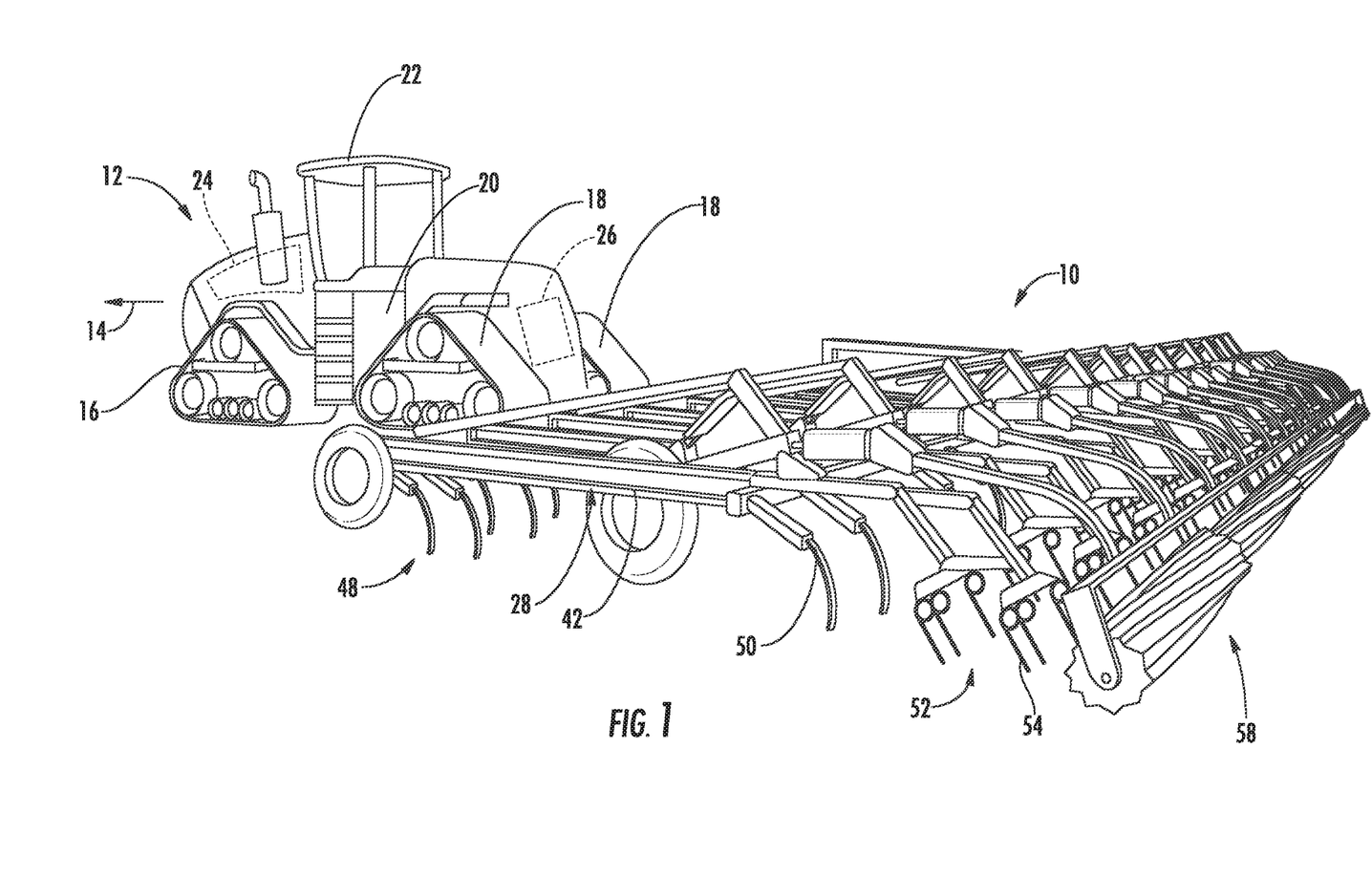
FIG. 1 illustrates a perspective view of one embodiment of an agricultural implement coupled to a work vehicle in accordance with aspects of the present subject matter.
Figure 2:
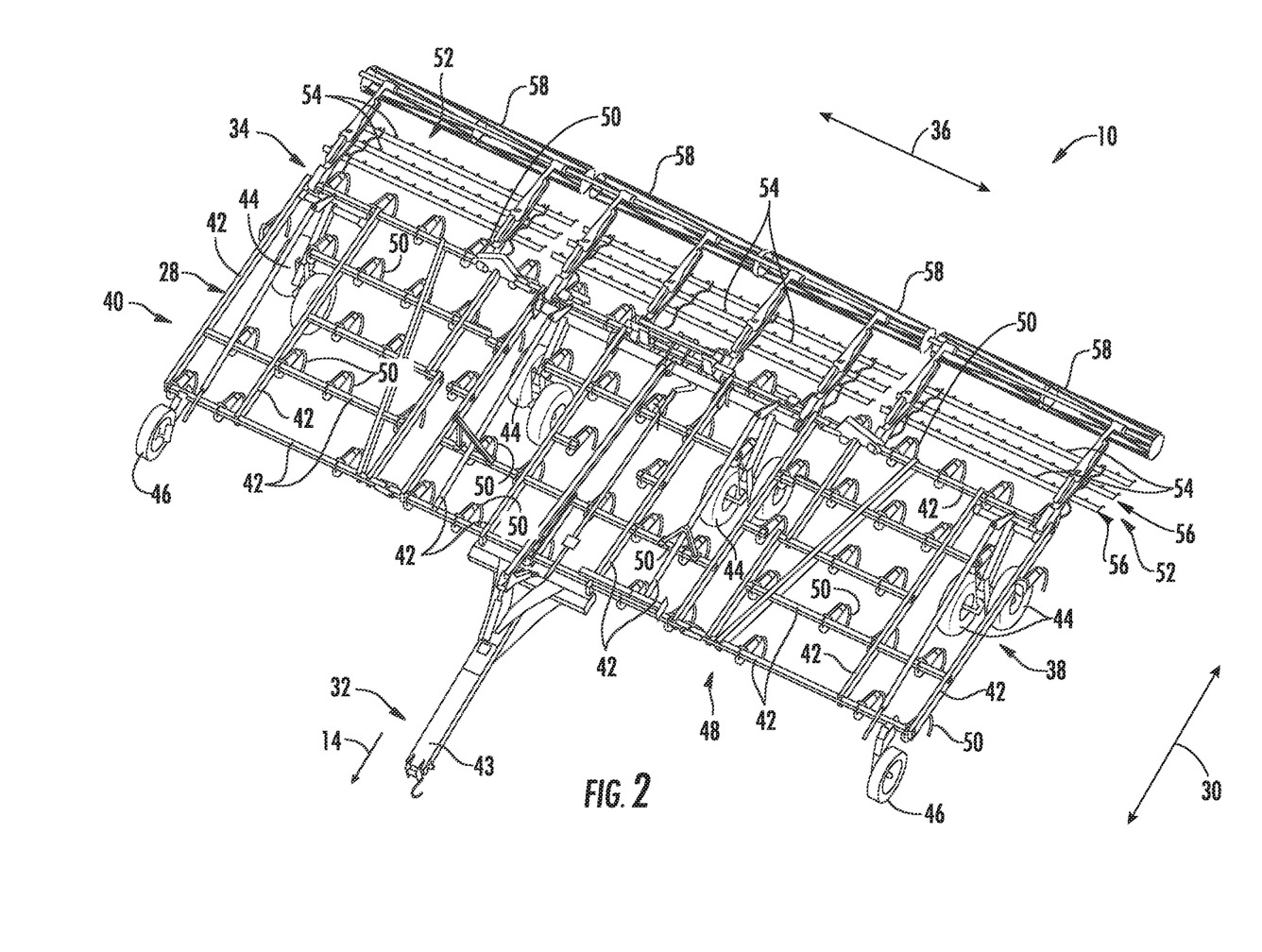
FIG. 2 illustrates an alternative perspective view of an agricultural implement in accordance with aspects of the present subject matter, particularly illustrating various components of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16 (one is shown), a pair of rear track assemblies 18, and a frame or Chassis 20 coupled to and supported by the track assemblies 16, 18. An operator's cab 22 may be supported by a portion of the chassis 20 and may house various input devices (e.g., a user interface 102 shown in FIG. 4) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include an implement frame 28. As shown in FIG. 2, the frame 28 may extend along a longitudinal direction 30 between a forward end 32 and an aft end 34. The frame 28 may also extend along a lateral direction 36 between a first side 38 and a second side 40. In this respect, the frame 28 generally includes a plurality of structural frame members 42, such as beams, bars, and/or the like, configured to support or couple to a plurality of components. Furthermore, a hitch assembly 43 may be connected to the frame 28 and configured to couple the implement 10 to the work vehicle 12. Additionally, a plurality of wheel assemblies may be coupled to the frame 28, such as a set of centrally located wheels 44 and a set of front pivoting wheels 46, to facilitate towing the implement 10 in the direction of travel 14.

In one embodiment, the frame 28 may be configured to support a cultivator 48, which may be configured to till or otherwise break the soil over which the implement 10 travels to create a seedbed. In this respect, the cultivator 48 may include a plurality of ground engaging shanks 50, which are pulled through the soil as the implement 10 moves across the field in the direction of travel 14. As will be discussed in greater detail below, the ground engaging shanks 50 may be configured to be pivotally mounted to the frame 28 in a manner that permits the penetration depths of the ground engaging shanks 50 to be adjusted.

Moreover, as shown in FIGS. 1 and 2, the implement 10 may also include one or more harrows 52. Specifically, in several embodiments, each harrow 52 may include a plurality of ground engaging tines 54 configured to engage to the surface of the soil within the field in a manner that levels or otherwise flattens any windrows or ridges in the soil created by the cultivator 48. As such, the ground engaging tines 54 may be configured to be pulled through the soil as the implement 10 moves across the field in the direction of travel 14. As shown, the ground engaging tines 54 of each harrow 52 may be arranged into a plurality of ranks 56, which are spaced apart from one another along the longitudinal direction 30 between the forward end 32 and the aft end 34 of the frame 28. Furthermore, within each of the ranks 56, the ground engaging tines 54 may be spaced apart from one another along the lateral direction 36 between the first side 38 and the second side 40 of the frame 28. As will be discussed in greater detail below, the harrow(s) 52 may be configured to be pivotally mounted to the frame 28 in a manner that permits the down pressure being applied to the ground engaging tines 54 thereon to be adjusted. Additionally, it should be appreciated that the implement 10 may include any suitable number of harrows 52.

Moreover, in one embodiment, the implement 10 may optionally include one or more baskets or rotary firming wheels 58. As is generally understood, the baskets) 58 may be configured to reduce the number of clods in the soil and/or firm the soil over which the implement 10 travels. As shown, each basket 58 may be configured to be pivotally coupled to one of the harrows 52. Alternatively, the basket(s) 58 may be configured to be pivotally coupled to the frame 28 or any other suitable location of the implement 10. It should be appreciated that the implement 10 may include any suitable number of baskets 58. In fact, some embodiments of the implement 10 may not include any baskets 58.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration. For example, in one embodiment, the implement 10 may be configured as a disk harrow.

Figure 3:
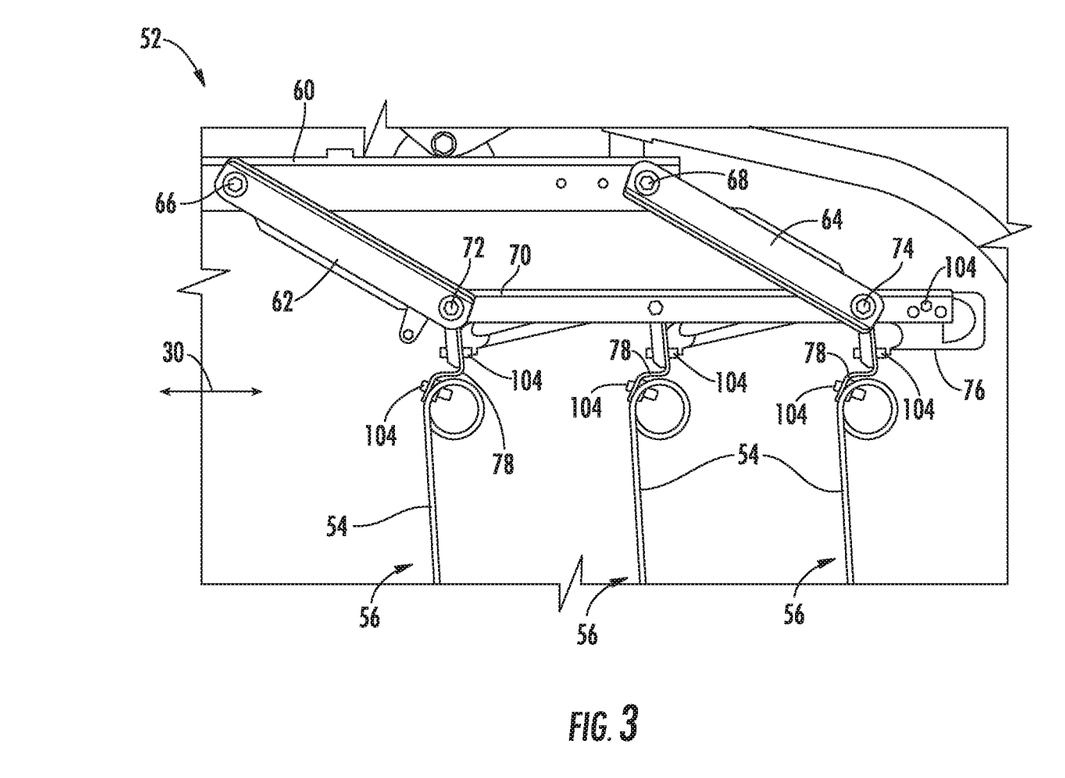
FIG. 3 illustrates a partial side view of one embodiment of a harrow suitable for use with an agricultural implement in accordance with aspects of the present subject matter.

Referring now to FIG. 3, a side view of one embodiment of the harrow 52 shown in FIGS. 1 and 2 is illustrated in accordance with aspects of the present subject matter. As shown, the harrow 52 may include an upper support arm 60 coupled to one of the frame members 42 of the implement frame 28. First and second linkage arms 62, 64 may be pivotally coupled to the upper support arm 60 at pivot joints 66, 68. Furthermore, a lower support arm 70 may be pivotally coupled to the first and second linkage arms 62, 64 at pivot joints 72, 74. Additionally, an adjustment arm 76 may slidably engage the lower support arm 70. Each rank 56 of ground engaging tines 54 may be coupled to a corresponding mounting member 78, which may, in turn, be coupled to the adjustment arm 76.

As shown in FIG. 3, the upper support arm 60, the first and second linkage arms 62, 64, and the lower support arm 70 may collectively form a four bar linkage, such as the illustrated parallelogram-shaped four-bar linkage. More specifically, the upper support arm 60 and the lower support arm 70 may generally be configured to be oriented in a parallel relationship. Similarly, the first and second linkage arms 62, 64 may generally be configured to be oriented in a parallel relationship. In this respect, the first and second linkage arms 62, 64 may allow the lower support arm 70 to pivot relative to the upper support arm 60. As such, the lower support arm 70 may move toward and away from the implement frame 28. Furthermore, the adjustment arm 76 may slide relative to the lower support arm 70 to adjust the orientation of the ground engaging tines 54 relative to the soil within the field. In alternate embodiments, the harrow 52 may have any other suitable configuration.

In accordance with aspects of the present subject matter, one or more load sensors may be provided in operative association with the harrow 52. Specifically, in several embodiments, the load sensor(s) may be configured to detect a parameter indicative of the load being exerted on one or more of the ground engaging tines 54 by the soil within the field across which the implement 10 is being moved. For example, in one embodiment, each load speed sensor may be configured as a load pin 104 coupled or otherwise positioned between two or more components of the harrow 52. As such, each load pin(s) may be configured to detect the load being applied thereto, which may, in turn, be indicative of the load(s) being applied to one or more of the ground engaging tines 54. However, it should be appreciated that, in alternative embodiments, the load sensor(s) may be configured as any other suitable device(s) for sensing or detecting the load(s) being applied to one or more of the ground engaging tines 54 by the soil within the field.

Furthermore, as shown in FIG. 3, the load pin(s) 104 may be coupled or otherwise positioned between any combination of components of the harrow 52. For example, in one embodiment, a load pin 104 may be coupled between the adjustment arm 76 and the lower support arm 70. In such embodiment, the load pin 104 may be configured to detect the average load being applied to each of the ground engaging tines 54 on the harrow 52. In another embodiment, a load pin 104 may be coupled between one or more of the mounting members 78 and the adjustment arm 76. In such embodiment, the load pin(s) 104 may be configured to detect the average load being applied to each of the ground engaging tines 54 of the corresponding rank 56 of tines 54. In a further embodiment, a load pin 104 may be coupled between one or more of the ground engaging tines 54 and the corresponding mounting member 78. In such embodiment, the load pin(s) 104 may be configured to detect the specific load being applied to the corresponding ground engaging tine 54. Alternatively, the load pin(s) 104 may be coupled between any other suitable components of the harrow 52.

It should be appreciated that the configuration of the harrow 52 described above and shown in FIG. 3 is provided only to place the present subject matter in an exemplary field of use. Thus, it should be appreciated that the present subject matter may be readily adaptable to any manner of harrow configuration.

Figure 4:
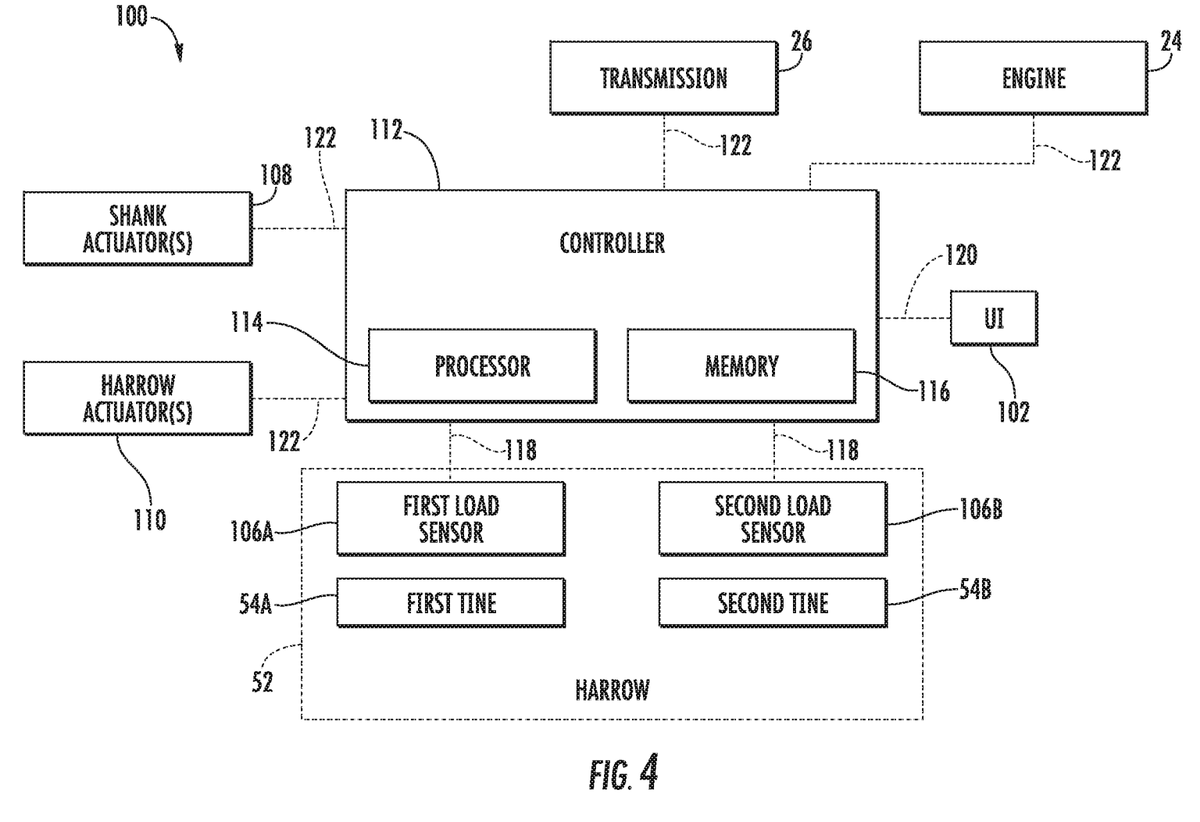
FIG. 4 illustrates a schematic view of one embodiment of a system for determining field characteristics of a field across which an agricultural implement is being moved in accordance with aspects of the present subject matter.

Referring now to FIG. 4, a schematic view of one embodiment of a system 100 for determining field characteristics of a field across which an agricultural implement is being moved is illustrated in accordance with aspects of the present subject matter. In general, the system 100 will be described herein with reference to the agricultural implement 10, the work vehicle 12, and the harrow 52 described above with reference to FIGS. 1-3. However, it should be appreciated by those of ordinary skill in the art that the disclosed system 100 may generally be utilized with agricultural implements having any other suitable implement configuration, work vehicles having any other suitable vehicle configuration, and/or harrows having any other suitable harrow configuration.

In several embodiments, the system 100 may include one or more components of the implement 10 and/or the work vehicle 12. Specifically, as shown in FIG. 4, the system 100 may include first and second ground engaging tines 54A, 54B of the harrow 52. As such, in one embodiment, the first and second ground engaging tines 54A, 54B may be spaced apart along the longitudinal direction 30 of the implement 10. In such embodiment, the first and second ground engaging tines 54A, 54B, for example, may be part of different ranks 56 of the harrow 52. Conversely, in an alternative embodiment, the first and second ground engaging tines 54A, 54B may be spaced apart along the lateral direction 36 the implement 10. In such embodiment, the first and second ground engaging tines 54A, 54B may, for example, be part of the same rank 56 of the harrow 52. Additionally, as shown in FIG. 4, the system 100 may include first and second load sensors 106A, 106B configured to detect parameters indicative of the loads being exerted on the first and second ground engaging tines 54A, 54B, respectively. However, it should be appreciated that, in alternative embodiments, the system 100 may include any other suitable components of the implement 10 and/or the work vehicle 12. For example, the system 100 may include tines that engage to surface of the soil, but do not perform a tillage operation on the soil.

Moreover, the system 100 may include one or more actuators of the implement 10. Specifically, in several embodiments, the system 100 may include one or more shank actuators 108, with each actuator 108 configured to adjust the position of one of the ground engaging shanks 50 relative to the implement frame 28. For example, a first end of each actuator 108 (e.g., a rod of the actuator 108) may be coupled to the corresponding ground engaging shank 50, while a second end of each actuator 108 (e.g., a cylinder of the actuator 108) may be coupled to the implement frame 28. The rod of each actuator 108 may be configured to extend and/or retract relative to the corresponding cylinder 108 to adjust the penetration depth of the corresponding ground engaging shank 50. Furthermore, the system 100 may also include one or more harrow actuators 110, with each actuator 110 configured to adjust the position of one of the harrows 52 relative to the implement frame 28. For example, a first end of each actuator 110 (e.g., a rod of the actuator 110) may be coupled to the corresponding harrow 52 (e.g., the upper support arm 60 of the harrow 52), while a second end of each actuator 110 (e.g., a cylinder of the actuator 110) may be coupled to the implement frame 28. The rod of each actuator 110 may be configured to extend and/or retract relative to the corresponding cylinder 110 to adjust the down pressure being applied to the ground engaging tines 54 of the corresponding harrow 52. However, it should be appreciated that, in alternative embodiments, the system 100 may include any other suitable actuators of the implement 10 and/or the work vehicle 12.

In accordance with aspects of the present subject matter, the system 100 may include a controller 112 configured to electronically control the operation of one or more components of the implement 10 and/or the work vehicle 12. In general, the controller 112 may comprise any suitable processor-based device known in the art, such as a computing device or any suitable combination of computing devices. Thus, in several embodiments, the controller 112 may include one or more processor(s) 114 and associated memory device(s) 116 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 116 of the controller 112 may generally comprise memory element(s) including, but not limited to, a computer readable medium (e.g., a random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 116 may generally be configured to store suitable computer-readable instructions that, when implemented by the processor(s) 114, configure the controller 112 to perform various computer-implemented functions, such as one or more aspects of the method 200 described below with reference to FIG. 5. In addition, the controller 112 may also include various other suitable components, such as a communications circuit or module, one or more input/output channels, a data/control bus and/or the like.

It should be appreciated that the controller 112 may correspond to an existing controller of the implement 10 or the work vehicle 12 or the controller 112 may correspond to a separate processing device. For instance, in one embodiment, the controller 112 may form all or part of a separate plug-in module that may be installed within the implement 10 or the work vehicle 12 to allow for the disclosed system and method to be implemented without requiring additional software to be uploaded onto existing control devices of the implement 10 or the work vehicle 12.

Furthermore, in one embodiment, the system 100 may also include the user interface 102. More specifically, the user interface 102 may be configured to provide feedback (e.g., notifications associated with the field characteristic(s) of the field across which the implement 10 is being moved) to the operator of the implement 10. As such, the user interface 102 may include one or more feedback devices (not shown), such as display screens, speakers, warning lights, and/or the like, which are configured to communicate such feedback. In addition, sonic embodiments of the user interface 102 may include one or more input devices (not shown), such as touchscreens, keypads, touchpads, knobs, buttons, sliders, switches, mice, microphones, and/or the like, which are configured to receive user inputs from the operator. In one embodiment, the user interface 102 may be positioned within the cab 22 of the work vehicle 12. However, in alternative embodiments, the user interface 102 may have any suitable configuration and/or be positioned in any other suitable location.

In several embodiments, the controller 112 may be configured to determine one or more field characteristics of the field across which the implement 10 is being moved. Specifically, as shown in FIG. 4, the controller 112 may be communicatively coupled to the load sensor(s), such as the first and second load sensors 106A, 106B, via wired or wireless connection to allow measurement signals (e.g., as indicated by dashed lines 118 in FIG. 4) to be transmitted from the load sensor(s) to the controller 112. In this regard, the controller 112 may be configured to determine or estimate the field characteristic(s) of the field based on the received measurement signals 118. Such field characteristic(s) may include the clod sizes of the soil within the field, the surface roughness of the soil within the field, the percent residue coverage of the field, and/or the residue size. For instance, the controller 112 may include a look-up table, suitable mathematical formula, and/or algorithms stored within its memory 116 that correlates the received measurement signals 118 to the field characteristic(s).

In one embodiment, the controller 112 may be configured to determine the field characteristic(s) for differing portions of the field. More specifically, as indicated above, the first and second ground engaging tines 54A, 54B may be spaced apart from each other along the lateral direction 36 of the implement 10. In this regard, the controller 112 may be configured to determine the field characteristic(s) of a first portion of the field (e.g., the portion of the field engaged by first ground engaging tine 54A) based on measurement signals 118 received from the first load sensor 106A. Similarly, the controller 112 may be configured to determine the field characteristic(s) of a second portion of the field (e.g., the portion of the field engaged by second ground engaging tine 54B), which is spaced apart from the first portion of the field along the lateral direction 36, based on measurement signals 118 received from the second load sensor 106A. It should be appreciated that, in alternative embodiments, the controller 112 may be configured to determine the field characteristic(s) for any other number of portions of the field, such as more or less than two portions of the field.

Furthermore, the controller 112 may be configured to monitor the determined field characteristic(s) and initiate one or more control actions when the field characteristic(s) exceeds or falls below a threshold field characteristic value(s). Specifically, in several embodiments, the controller 112 may be configured to compare the values associated with the monitored field characteristic(s) to an associated threshold field characteristic value. Thereafter, in the event that the value(s) of the monitored field characteristic(s) exceeds or falls below the associated threshold field characteristic value (thereby indicating that the field characteristic(s) the field may be too high or too low), the controller 112 may be configured to initiate one or more control actions.

Additionally, the controller 112 may be configured to monitor a differential(s) between the field characteristics of the first and second portions of the field and initiate one or more control actions when the monitored differential(s) has exceeded a maximum differential threshold(s). Specifically, in one embodiment, the controller 112 may be configured to compare the value(s) associated with the monitored field characteristic(s) of the first portion of the field to the value(s) associated with the monitored field characteristic(s) of the second portion of the field to determine the differential(s) therebetween. Thereafter, in the event that the determined differential(s) exceeds or falls below an associated maximum differential threshold (thereby indicating that the differential between the field characteristics of the first and second portions of the field may be too high), the controller 112 may be configured to initiate one or more control actions.

In one embodiment, the controller 112 may be configured to notify the operator of implement 10 that the value(s) of the monitored field characteristic(s) has exceeded or fallen below the associated threshold field characteristic value. Specifically, in one embodiment, the controller 112 may be communicatively coupled to the user interface 102 via a wired or wireless connection to allow feedback signals (e.g., indicated by dashed line 120 in FIG. 4) to be transmitted from the controller 112 to the user interface 102. In such embodiment, the feedback signals 120 may instruct the user interface 102 to provide a notification to the operator of the implement 10 (e.g., by causing a visual or audible notification or indicator to be presented to the operator) that provides an indication that the value(s) of the monitored field characteristic(s) has exceeded or fallen below the associated threshold field Characteristic value. In such instances, the operator may then choose to initiate any suitable corrective action he/she believes is necessary, such as adjusting one or more operating parameters of the implement 10 and/or the work vehicle 12.

Moreover, in several embodiments, the controller 112 may be configured to automatically adjust one or more operating parameters of the implement 10 when it is determined that the value(s) of the monitored field characteristic(s) has exceeded or fallen below the associated threshold field characteristic value. Specifically, as shown in FIG. 4, the controller 112 may be communicatively coupled to the shank actuator(s) 108 and/or the harrow actuator(s) 110 of the implement 10 via a wired or wireless connection to allow control signals 122 (e.g., as indicated by dashed lines 122 in FIG. 4) to be transmitted from the controller 112 to the actuator(s) 108 and/or the actuators 110. As such, the controller 112 may be configured to transmit control signals 122 to the shank actuator(s) 108 instructing the actuator(s) 108 to adjust the penetration depth of the corresponding ground engaging shank(s) 50. In addition, the controller 112 may be configured to transmit control signals 122 to the harrow actuator(s) 110 instructing the actuator(s) 110 to adjust the down pressure being applied to the associated ground engaging tines 54.

Furthermore, in one embodiment, the controller 112 may be configured to automatically adjust the ground speed at Which the work vehicle 12 is towing the implement 10 across the field when it is determined that the value(s) of the monitored field characteristic(s) has exceeded or fallen below the associated threshold field characteristic value. Specifically, the controller 112 may be communicatively coupled to the engine 24 and/or the transmission 26 of the work vehicle 12 via, a wired or wireless connection to allow control signals 122 to be transmitted from the controller 112 to the engine 24 and/or the transmission 26. For example, the control signals 122 may be configured to instruct the engine 24 to vary its power output to increase or decrease the ground speed of the work vehicle 12 in a manner that adjusts the field characteristic(s) of the field. Similarly, the control signals 122 may be configured to instruct the transmission 26 to upshift or downshift to change the ground speed of the work vehicle 12 in a manner that adjusts the field characteristic(s) of the field. However, it should be appreciated that, in alternative embodiments, the controller 112 may be configured to transmit control signals to any other suitable component of the work vehicle 12 and/or implement 10 such that the ground speed of the work vehicle 12 and/or implement 10 is adjusted.

As indicated above, in one embodiment, the field characteristic(s) may include the clod size of the soil within the field. In such embodiment, the controller 112 may be configured to determine or estimate the clod size of the soil within the field across which the implement 10 is being moved based on the received measurement signals 118. For instance, the controller 112 may include a look-up table, suitable mathematical formula, and/or algorithms stored within its memory 116 that correlates the received measurement signals 122 to the clod size of the soil. Thereafter, in the event that the value(s) of the determined clod size exceeds a maximum clod size value (thereby indicating that the clod size of the soil may be too high), the controller 112 may be configured to increase the ground speed of the implement 10. For instance, the controller 112 may be configured to transmit control signals 122 to the engine 24 instructing the engine 24 to increase its power output (e.g., by increasing the volume of fuel supplied to the engine 24) to increase the ground speed of the work vehicle 12 in a manner that reduces the clod size of the sod. In addition, the controller 112 may be configured to transmit control signals 122 the transmission 26 instructing the transmission 26 to upshift to increase the ground speed of the work vehicle 12 in a manner that reduces the clod size of the soil.

Moreover, as indicated above, in one embodiment, the field characteristic(s) may include the percent residue coverage of the soil within the field. In such embodiment, the controller 112 may be configured to determine or estimate the percent residue coverage of the soil within the field across which the implement 10 is being moved based on the received measurement signals 118. For instance, the controller 112 may include a look-up table, suitable mathematical formula, and/or algorithms stored within its memory 116 that correlates the received measurement signals 122 to the percent residue coverage of the soil. Thereafter, in the event that the value(s) of the determined percent residue coverage exceeds a maximum percent residue coverage value (thereby indicating that the percent residue coverage of the soil may be too high), the controller 112 may be configured to increase the penetration depth(s) of the ground engaging shank(s) 50 of the implement 10 to bury more residue. For instance, the controller 112 may be configured to transmit control signals 122 to the shank actuator(s) 108 instructing the shank actuator(s) 108 to increase the penetration depth(s) of the ground engaging shank(s) 50. Conversely, in the event that the value(s) of the determined percent residue coverage falls below a minimum percent residue coverage value (thereby indicating that the percent residue coverage of the soil may be too low), the controller 112 may be configured to decrease the penetration depth(s) of the ground engaging shank(s) 50 of the implement 10 to bury less residue. For instance, the controller 112 may be configured to transmit control signals 122 to the shank actuator(s) 108 instructing the shank actuator(s) 108 to decrease the penetration depth(s) of the ground engaging shank(s) 50.

Additionally, in one embodiment, the controller 112 may be configured to determine a tillage effectiveness characteristic of a tillage operation being performed by the implement 10. More specifically, as indicated above, the first and second ground engaging tines 54A, 54B may be spaced apart from each other along the longitudinal direction 30 of the implement 10. For example, in one embodiment, the first ground engaging tine 54A may be positioned within a forward-most rank 56 of the harrow 52, while the second ground engaging tine 54B may be positioned within a rear-most rank 56 of the harrow 52. In this regard, the controller 112 may be configured to determine the field characteristic(s) of the field before a tillage operation is performed by the harrow 52 based on measurement signals 118 received from the first load sensor 106A. Conversely, the controller 112 may be configured to determine the field characteristic(s) of the field after the tillage operation is performed by the harrow 52 based on measurement signals 118 received from the second load sensor 106B. The controller 112 may be configured to compare the value(s) associated with the monitored field characteristic(s) of the field before the tillage operation to the value(s) associated with the monitored field characteristic(s) of the field after the tillage operation to determine the differential(s) therebetween. Thereafter, the controller 112 may be configured to determine the tillage effectiveness characteristic based on the determined differential. For instance, the controller 112 may include a look-up table, suitable mathematical formula, and/or algorithms stored within its memory 116 that correlates the determined differential to the tillage effectiveness characteristic. It should be appreciated that the tillage effectiveness Characteristic may be any suitable indicator of the effectiveness of the tillage operation being performed by the harrow 52, such as a reduction in the clod size of the soil, a reduction in surface roughness of the soil, and/or the like.

Figure 5:
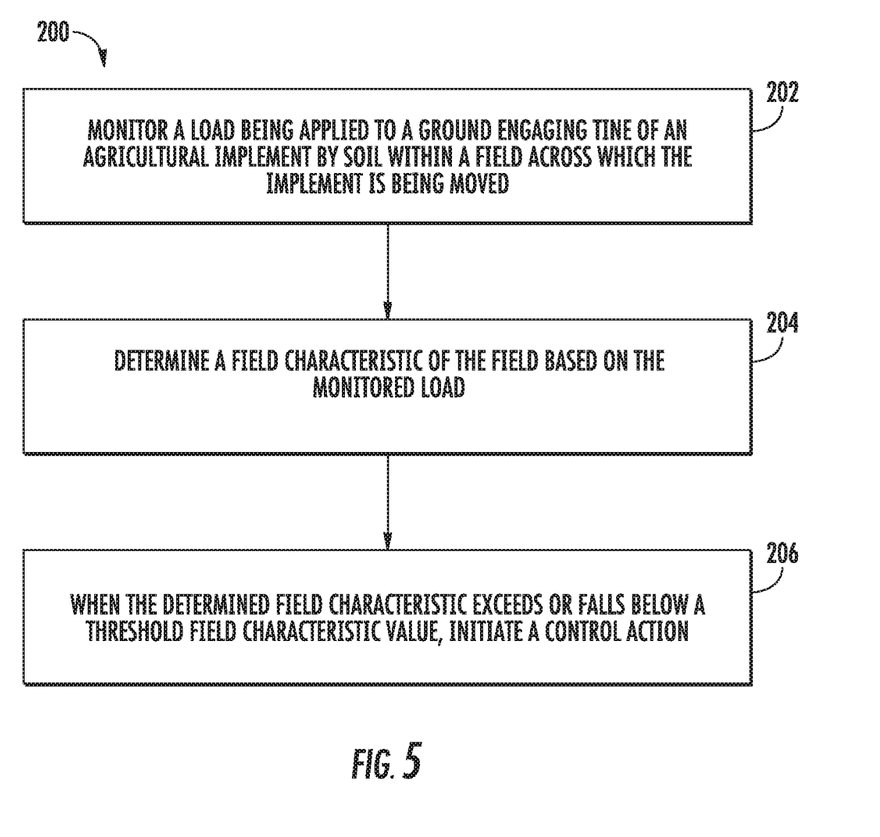
FIG. 5 illustrates a flow diagram of one embodiment of a method for determining field characteristics of a field across which an agricultural implement is being moved in accordance with aspects of the present subject matter.

Referring now to FIG. 5, a flow diagram of one embodiment of a method 200 for determining field characteristics of a field across which an agricultural implement is being moved is illustrated in accordance with aspects of the present subject matter. In general, the method 200 will be described herein with reference to the implement 10 and the system 100 described above with reference to FIGS. 1-4. However, it should be appreciated by those of ordinary skill in the art that the disclosed method 200 may generally be utilized to determine field characteristics of the field in connection with any agricultural implement having any suitable implement configuration and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include monitoring, with a computing device, a load being applied to a ground engaging tine of an agricultural implement by soil within a field across which the implement is being moved. For instance, as described above, the controller 112 may be communicatively coupled to one or more load sensors, such as the first and second load sensors 106A, 106B, provided in operative association with one or more ground engaging tines 54 of the implement 10, such the first and second tines 54A, 54B. As such, when the implement 10 is being towed across the field by the work vehicle 12, the controller 112 may be configured to monitor the load(s) being applied to the ground engaging tine(s) 54 based on measurement signals 118 received from the load sensor(s).

Additionally, at (204), the method 200 may include determining, with the computing device, a field characteristic of the field based on the monitored load. For instance, as described above, the controller 112 may be configured to determine or estimate one or more soil field characteristics of the soil within the field across which the implement 10 is being moved based on the received measurement signals 118. For example, such field characteristic(s) may include the clod size of the soil with the field, the surface roughness of the soil within the field, the percent residue coverage of the field, and/or the residue size.

Moreover, as shown in FIG. 5, at (206), when the determined field characteristic exceeds or falls below a threshold field characteristic value, the method 200 may include initiating, with the computing device, a control action. For instance, as described above, the controller 112 may be communicatively coupled to the shank actuator(s) 108 of the implement 10, the harrow actuator(s) 110 of the implement 10, the engine 24 of the work vehicle 12, and/or the transmission 26 of the work vehicle 12. As such, when the determined field characteristic(s) exceeds or falls below a threshold field characteristic value(s), the controller 112 may be configured to transmit control signals 122 to the actuator(s) 108, the actuator(s) 110, the engine 24, and/or the transmission 26 instructing such devices to adjust one or more operating parameters of the implement 10. For example, such operating parameters may include the penetration depth(s) of the ground engaging shank(s) 50, the down pressure being applied to ground engaging tines 54, and/or the ground speed of the implement 10.

It is to be understood that the steps of the method 200 are performed by the controller 112 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 112 described herein, such as the method 200, is implemented in software code or instructions which are tangibly stored on a tangible computer readable medium. The controller 112 loads the software code or instructions via a direct interface with the computer readable medium or via a wired and/or wireless network. Upon loading and executing such software code or instructions by the controller 112, the controller 112 may perform any of the functionality of the controller 112 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for determining field characteristics of a field across which an implement is being moved, the system comprising:
   a tine configured to engage a surface of soil within the field;
   a sensor configured to detect a load being applied to the ground engaging tine by the soil, and
   a controller communicatively coupled to the sensor, the controller being configured to determine a field characteristic of the field based on the detected load being applied to the ground engaging tine.

2. The system of claim 1, wherein the field characteristic comprises at least one of a clod size of the soil with the field, a surface roughness of the soil within the field, or a residue characteristic of the field.

3. The system of claim 2, wherein the residue characteristic comprises at least one of percent residue coverage of the field or a residue size.

4. The system of claim 1, wherein the controller is further configured to monitor the field characteristic relative to a threshold field characteristic value and initiate a control action when the monitored field characteristic has exceeded or fallen below the threshold field characteristic value.

5. The system of claim 4, wherein the control action comprises notifying an operator of the agricultural implement that the monitored field characteristic has exceeded or fallen below the threshold field characteristic value.

6. The system of claim 4, wherein the control action comprises adjusting an operating parameter of the agricultural implement.

7. The system of claim 6, wherein the operating parameter comprises at least one of a penetration depth of one or more ground engaging shanks of the agricultural implement, a down pressure being applied to the ground engaging tine, or a ground speed of the agricultural implement.

8. The system of claim 1, wherein the ground engaging tine corresponds to a first ground engaging tine and the sensor corresponds to a first sensor, the system further comprising:
   a second ground engaging tine spaced apart from the first ground engaging tine along a lateral direction of the agricultural implement; and
   a second sensor configured to detect a load being applied to the second ground engaging tine by the soil, the controller further configured to determine the field characteristic of a first portion of the field based on the load detected by the first sensor and the field characteristic of a second portion of the field based on the load detected by the second sensor.

9. The system of claim 8, wherein the controller is further configured to monitor a differential between the field characteristic of the first portion of the field and the field characteristic of the second portion of the field and initiate a control action when it is determined that the monitored differential has exceeded a maximum differential threshold.

10. The system of claim 1, wherein the ground engaging tine corresponds to a first ground engaging tine and the sensor corresponds to a first sensor, the system further comprising:
    a second ground engaging tine spaced apart from the first ground engaging tine along a longitudinal direction of the agricultural implement; and
    a second sensor configured to detect a load being applied to the second ground engaging tine by the soil, the controller further configured to determine a tillage effectiveness characteristic associated with the agricultural implement based on the loads detected by the first and second sensors.

11. An agricultural implement, comprising:
    a frame;
    a harrow supported on the frame, the harrow comprising a tine configured to soil within a field across which the agricultural implement is being moved;
    a load pin configured to detect a load being applied to the ground engaging tine by the soil; and
    a controller communicatively coupled to the load pin, the controller configured to determine a field characteristic of the field based on the load detected by the load pin.

12. The agricultural implement of claim 11, wherein the harrow further comprises:
    a lower support arm;
    an adjustment member slidably coupled to the lower support arm; and
    a mounting member coupled to the adjustment member, the ground engaging tine being coupled to the mounted member.

13. The agricultural implement of claim 12, wherein the load pin is positioned between the lower support arm and the adjustment member.

14. The agricultural implement of claim 12, wherein the load pin is positioned between adjustment member and the mounting member.

15. The agricultural implement of claim 12, wherein the load pin is positioned between ground engaging tine and the mounting member.

16. A method for determining field characteristics of a field across which an agricultural implement is being moved, the agricultural implement including a tine configured to engage a surface of soil within the field, the method comprising:
    monitoring, with a computing device, a load being applied to the ground engaging tine by soil within the field;
    determining, with the computing device, a field characteristic of the field based on the monitored load; and
    when the determined field characteristic exceeds or falls below a threshold field characteristic value, initiating, with the computing device, a control action.

17. The method of claim 16, wherein the field characteristic comprises at least one of a clod size of the soil with the field, a surface roughness of the soil within the field, or a residue characteristic of the field.

18. The method of claim 17, wherein the residue characteristic comprises at least one of percent residue coverage of the field or a residue size.

19. The method of claim 16, wherein the control action comprises notifying an operator of the agricultural implement that the monitored field characteristic has exceeded or fallen below the threshold field characteristic value.

20. The method of claim 16, wherein the control action comprises adjusting an operating parameter of the agricultural implement.

* * * * *